US012001559B1

(12) United States Patent
Kesler et al.

(10) Patent No.: US 12,001,559 B1
(45) Date of Patent: Jun. 4, 2024

(54) DESIGNATED SURVIVOR WITHIN MULTI-NODE REPLICATION SYSTEMS

(71) Applicant: Amazon Technologies, Inc., Seattle, WA (US)

(72) Inventors: Nicholas B. Kesler, Lynchburg, VA (US); David Ruysser Gabler, Atascadero, CA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 17/540,770

(22) Filed: Dec. 2, 2021

(51) Int. Cl.
*G06F 21/57* (2013.01)
*G06F 16/27* (2019.01)

(52) U.S. Cl.
CPC .............. *G06F 21/57* (2013.01); *G06F 16/27* (2019.01); *G06F 2221/034* (2013.01)

(58) Field of Classification Search
CPC ... H04L 63/14–1441; G06F 21/50–577; G06F 2221/034; G06F 16/27
See application file for complete search history.

(56) References Cited

U.S. PATENT DOCUMENTS

2018/0260125 A1* 9/2018 Botes ................... G06F 11/1662
2022/0417264 A1* 12/2022 Moon ..................... H04L 63/20

\* cited by examiner

*Primary Examiner* — Trong H Nguyen
(74) *Attorney, Agent, or Firm* — BakerHostetler

(57) ABSTRACT

A node disconnection rotation may be performed on an active synchronizing node pool of a multi-node replication system. The node disconnection rotation may ensure that at least one node is disconnected from the active synchronizing node pool at any given time. A disconnected node does not synchronize with other nodes during the time that it is disconnected. A disconnected node may, therefore, serve as a designated survivor, from which the system may be restored, when other active nodes are subject to a cyber-attack. Although the disconnected designated survivor node may potentially be compromised, it may be sanitized of any malicious contents prior to restart.

20 Claims, 8 Drawing Sheets

DESIGNATED SURVIVOR WITHIN MULTI-NODE REPLICATION SYSTEMS

BACKGROUND

Cyber-attacks have become increasingly common and problematic occurrences. Cyber-attacks may result in significant corruption and/or loss of data and other resources. Ransomware attacks may require businesses and other entities to pay substantial amounts of money in order to have their data restored. Even if the ransom is not paid, the loss of time and resources for responding to an attack, as well as potential reputational damages, may be significant. Multi-leader replication systems are multi-node replication systems in which data writes may be processed in various leader nodes and then replicated (e.g., asynchronously) to other leader nodes. Due at least in part to this configuration, multi-leader systems may sometimes be vulnerable to cyber-attacks.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
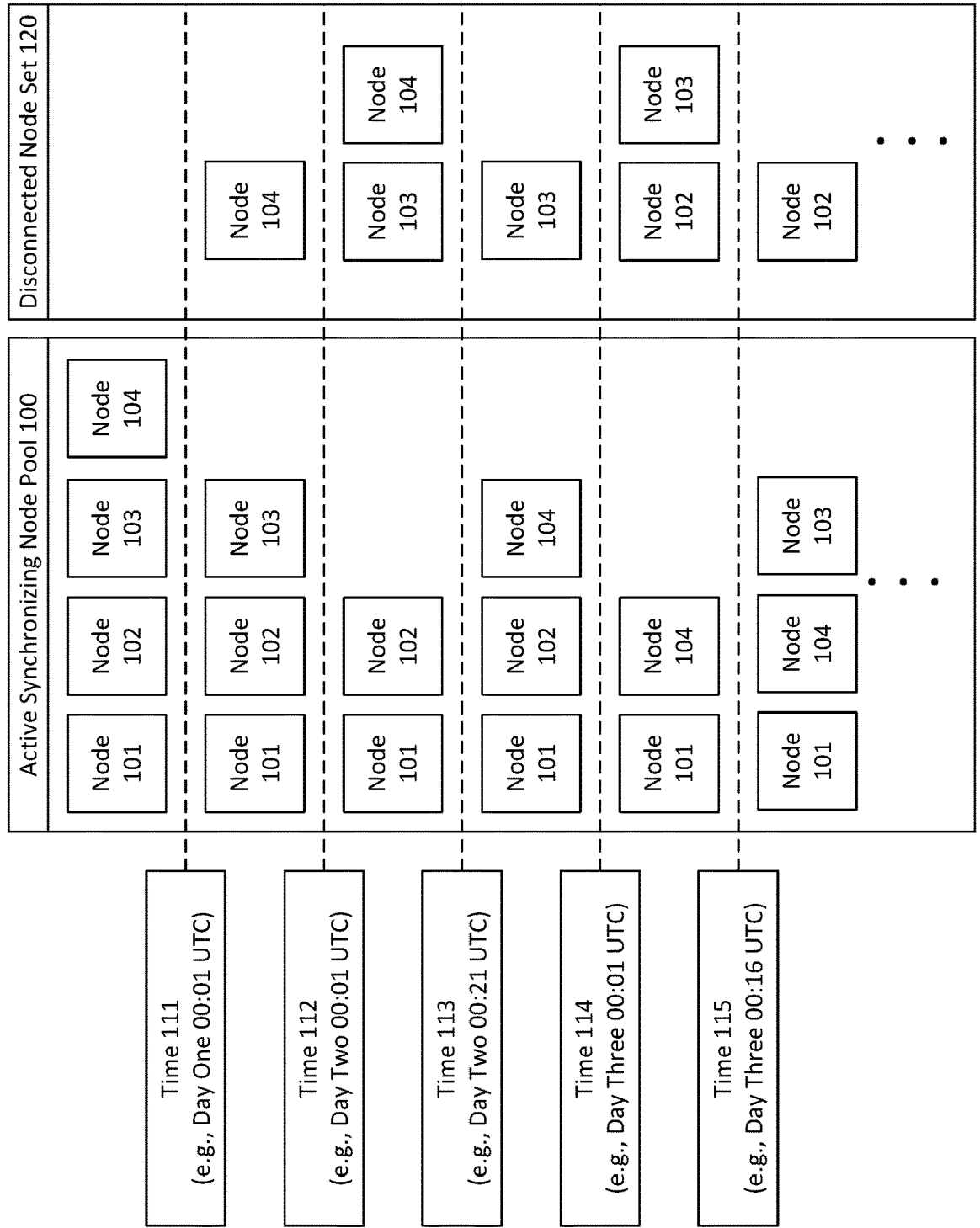
FIG. 1 is a diagram illustrating an example designated survivor system with fixed node rotation that may be used in accordance with the present disclosure.

Techniques for employing a designated survivor within multi-node replication systems, such as multi-leader replication systems, are described herein. Specifically, a multi-node replication system may have an active synchronizing node pool. For example, a multi-leader replication system may have an active synchronizing node pool, such as may include leader nodes of the multi-leader replication system. Leader nodes are nodes that may receive data writes and replicate (e.g., asynchronously) the writes to other leader nodes. Nodes that are included within the active synchronizing node pool, at any given time, may synchronize with one another, such as by replicating data between nodes. A node of a replication system, as that term is used herein, refers to data storage that can be disconnected from, and reconnected to, an active synchronizing node pool independently of other system nodes. As described herein, a node disconnection rotation may be performed on the active synchronizing node pool. The node disconnection rotation may ensure that at least one node is disconnected from the active synchronizing node pool at any given time. Specifically, for multi-leader systems, the node disconnection rotation may ensure that at least one leader node is disconnected from the active synchronizing node pool at any given time. A disconnected node does not synchronize with other nodes during the time that it is disconnected. A disconnected node may, therefore, serve as a designated survivor, from which the system may be restored, when other active nodes are subject to a cyber-attack.

A first iteration of the node disconnection rotation may include performing, at a first time, a first disconnection, of a first node, from the active synchronizing node pool. At a second time subsequent to the first time, a second disconnection may be performed of a second node, from the active synchronizing node pool. At a third time subsequent to the second time, a first reconnection may be performed of the first node, to the active synchronizing node pool. After the first reconnection, the first node may be synchronized with the active synchronizing node pool. At a fourth time subsequent to the third time, a second reconnection may be performed of the second node, to the active synchronizing node pool. After the second reconnection, the second node may be synchronized with the active synchronizing node pool. One or more additional iterations of the node disconnection rotation may also be performed. Each of the one or more additional iterations may include disconnecting and reconnecting of two respective nodes (e.g., the first node, the second node, and/or one or more other nodes). The first disconnection in each of the one or more additional iterations may be performed subsequent to the first reconnection, and prior to the second reconnection, of a preceding iteration of the node disconnection rotation.

In some examples, node disconnections may be performed at fixed intervals, such as at twenty-four hour intervals. For example, the second disconnection, which is performed at the second time, may be performed twenty-four hours after the first node disconnection, which is performed at the first time. Additional subsequent node disconnections may also be performed in twenty-four hour intervals. It is noted that other disconnection time intervals (i.e., other than twenty-four hours) may also be used. In some examples, the disconnection time intervals may be long enough so that each node that is disconnected, and then reconnected, is able to fully synchronize with other active nodes before being disconnected again. As described below, there is no requirement that nodes must be disconnected at fixed intervals. For example, nodes may be disconnected at times that are determined dynamically or at other non-fixed intervals.

In some examples, after disconnecting a node, the system may wait for a short (e.g., between five and thirty minutes) buffer period to reconnect a previously disconnected node. For example, the first reconnection of the first node (performed at the third time) may be performed shortly (e.g., between five and thirty minutes) after the second disconnection of the second node (performed at the second time). In some examples, the buffer period may be selected as a random number of minutes after the second time, such as a random number between five minutes and thirty minutes. Use of the random time period may help to prevent scenarios in which high quantities of node disconnections are being performed at exactly the same time, which could result in a spike in usage of computing resources and potential resulting delays. The use of this buffer period may help to ensure that the second node is fully disconnected prior to reconnection of the first node. A similar buffer period may also be employed for subsequent node reconnections.

Thus, the above-described node disconnection rotation may ensure that at least one node (i.e., a designated survivor node) is disconnected from the active synchronizing node pool at any given time. In some cases, this may allow the data on the disconnected designated survivor node to be potentially preserved in the case of a cyber-attack that destroys backend multi-node infrastructure. As will be described in detail below, although the disconnected designated survivor node may potentially be compromised, it may be sanitized of any malicious contents prior to restart. Moreover, because nodes may be repeatedly disconnected from, and reconnected to, the active synchronizing node pool, the data on the disconnected designated survivor node may be relatively (although not entirely) up to date. For example, for the above-described scenario in which nodes are disconnected from the active synchronizing node pool in twenty-four hour intervals, the state of the data on the disconnected designated survivor node may never be more than twenty-four hours old. Furthermore, use of a designated survivor node may allow the system to be restored from a peer node, which was formerly active and synchronized with other peers (e.g., as opposed to use of a backup).

The designated survivor techniques described herein may offer a number of advantages over some conventional techniques, which may rely on the use of stale backups. For example, some conventional techniques may employ a backup that is created by taking an image of a system. However, the use of images may be problematic when attempting to restore an image. This is because the image may be restored onto different hardware than the original system, and this different hardware may have different attributes (e.g., serial numbers) than the original system, thereby potentially creating conflicts when these new attributes do not match the original system. Additionally, when a backup is created using an export of system data, the rebuilding of a replacement system to allow import of the data may be challenging and time-consuming. Furthermore, many backup systems may employ the use of incremental and/or differential backups, thereby requiring replay of these incremental and/or differential backups to restore the system. Moreover, some backups may remain attached to a host system (e.g., as an attached volume), thereby creating the potential for the backup to be corrupted in the case of an attack.

In some examples, management of the node disconnection rotation may be provided as a service, for example by a multi-tenant computing service provider. Providing these features as a service may allow for automated and highly robust control of various features of the node rotation, restoration and other processes. For example, as described above, nodes may be disconnected from the active synchronizing pool at fixed intervals, such as twenty-four hour intervals. In some other examples, however, the node disconnection intervals may vary dynamically. In one specific example, a management service may monitor the active synchronizing pool to dynamically determine when a reconnected node has fully synchronized with other nodes in the system. In some examples, once the node has fully synchronized, the node may be disconnected again (and/or may be designated as eligible to be disconnected). This dynamic monitoring may help to ensure that a node is not disconnected from the active synchronizing pool before the node has synchronized with the active pool. Additionally, the dynamic monitoring techniques may also optionally allow node disconnections to be performed more frequently (by confirming when nodes are fully synchronized), thereby allowing survivor nodes to potentially be more up to date (since they may be disconnected for less time).

In some examples, after a survivor node has been disconnected from the active pool, a user may become aware, or may suspect, that the survivor node has been contaminated. For example, in some cases, the disconnected node could include malicious contents for launching a time-bomb attack that has been launched on active nodes but that has not yet launched on the disconnected node. In these scenarios, before restarting the disconnected node, a user may sanitize the disconnected node, such as by locating and removing the malicious contents. In some examples, a computing service may offer a recovery mode that provides a variety of features for sanitizing, recovering, and restarting a disconnected node that has been contaminated. For example, the service may automatically generate a snapshot copy of the disconnected node, such as to potentially allow a plurality of opportunities to sanitize and restart the disconnected node. Additionally, in some examples, the service may provide malware scanning and/or file scanning tools (and/or links to third-party tools) to assist in locating and removing the malicious contents of the disconnected node. Furthermore, in some examples, the service provider may create a sandbox to use as an isolated environment for performing forensics related to searching for malicious contents and restarting the disconnected node.

In some examples, a node that is disconnected from the active synchronizing node pool may be frozen. This means that the disconnected node may not be reconnected to the system at its regular spot in the rotation (i.e., after a subsequent node disconnection). In some examples, instead of being reconnected to the system, the frozen node may be replaced with a new node that is added to the synchronizing node pool. Freezing a node may allow a system's state at a given point in time to be preserved, such as for use at a later time. As a specific example, quarterly financial reports may be prepared for a business, and a node may be disconnected and frozen at the end of a quarter. This may allow the system's state at the end of the quarter to be preserved, such as to allow the quarterly report to be prepared at a later time using the preserved state. In some examples, when a node is disconnected and frozen, access to the node may be highly restricted, such as to preserve the state of the frozen node. For example, in some cases, even a root user of an account may be at least temporarily blocked from accessing the frozen node.

FIG. 1 is a diagram illustrating an example designated survivor system that may be used in accordance with the present disclosure. In the example of FIG. 1, a multi-node replication system, such as an online multi-leader replication system, may include nodes 101-104, which are computing nodes. For example, nodes 101-104 may each be leader nodes within a multi-leader replication system. Leader nodes are nodes that may receive data writes and replicate (e.g., asynchronously) the writes to other leader nodes. The multi-node replication system has an active synchronizing node pool 100. At any given time, one or more of nodes 101-104 may be included in the active synchronizing node pool 100, and these nodes are referred to as active nodes. Additionally, at any given time, one or more other of nodes 101-104 may be disconnected from the active synchronizing node pool 100, and these nodes are referred to as disconnected nodes. The disconnected nodes are shown in disconnected node set 120. The active nodes that are included within the active synchronizing node pool 100, at any given time, may synchronize with one another, such as by replicating data between themselves. As described herein, a node disconnection rotation may be performed on the active synchronizing node pool 100. The node disconnection rotation may ensure that at least one node is disconnected from the active synchronizing node pool 100 at any given time. Specifically, for multi-leader systems, the node disconnection rotation may ensure that at least one leader node is disconnected from the active synchronizing node pool 100 at any given time. A disconnected node does not synchronize with other nodes during the time that it is disconnected.

FIG. 1 shows example changes to the active synchronizing node pool 100 and the disconnected node set 120 that are performed at times 111-115. Additionally, In the example of FIG. 1, a first iteration of the node disconnection rotation may include performing, at time 111, a first disconnection, of node 104, from the active synchronizing node pool 100. Specifically, as shown in FIG. 1, time 111 has a corresponding horizontal dashed line. On top of this dashed line (which is prior to time 111), node 104 is included in the active synchronizing node pool 100. However, below this dashed line, node 104 is moved to the disconnected node set 120. This indicates that the node 104 is disconnected at time 111. At time 112, which is subsequent to time 111, a second disconnection may be performed of node 103, from the active synchronizing node pool 100. Specifically, as shown in FIG. 1, time 112 has a corresponding horizontal dashed line. On top of this dashed line (which is prior to time 112), node 103 is included in the active synchronizing node pool 100. However, below this dashed line, node 103 is moved to the disconnected node set 120. This indicates that the node 103 is disconnected at time 112. At time 113, which is subsequent to time 112, a first reconnection may be performed of node 104, to the active synchronizing node pool 100. Specifically, as shown in FIG. 1, time 113 has a corresponding horizontal dashed line. On top of this dashed line (which is prior to time 112), node 104 is included in the disconnected node set 120. However, below this dashed line, node 104 is moved back to the active synchronizing node pool 100. This indicates that the node 104 is reconnected at time 112. After the first reconnection, node 104 may be synchronized with the active synchronizing node pool 100. At time 115, which is subsequent to time 113, a second reconnection may be performed of node 103, to the active synchronizing node pool 100. Specifically, as shown in FIG. 1, time 115 has a corresponding horizontal dashed line. On top of this dashed line (which is prior to time 115), node 103 is included in the disconnected node set 120. However, below this dashed line, node 103 is moved back to the active synchronizing node pool 100. This indicates that the node 103 is reconnected at time 112. After the second reconnection, node 103 may be synchronized with the active synchronizing node pool 100.

One or more additional iterations of the node disconnection rotation may also be performed. Each of the one or more additional iterations may include disconnecting and reconnecting of two respective nodes (e.g., any two of nodes 101-104). The first disconnection in each of the one or more additional iterations may be performed subsequent to the first reconnection, and prior to the second reconnection, of a preceding iteration of the node disconnection rotation. For example, in FIG. 1, a first disconnection of a second iteration of the node disconnection rotation is performed, at time 114, by disconnecting node 102 from the active synchronizing node pool 100. Time 114 is subsequent to the first reconnection of the first iteration of the node disconnection rotation (e.g., the reconnection of node 104), which is performed at time 113. Additionally, time 114 is prior to the second reconnection of the first iteration of the node disconnection rotation (e.g., the reconnection of node 103), which is performed at time 115.

In some examples, node disconnections may be performed at fixed intervals, such as at twenty-four hour intervals. In one specific example shown in FIG. 1, the first disconnection of node 104, at time 111, may be performed on Day One at 00:01 coordinated universal time (UTC), and the second disconnection of node 103, at time 112, may be performed on Day Two at 00:01 (UTC). Thus, there may be a twenty-four hour interval from the first disconnection to the second disconnection. Additional subsequent node disconnections may also be performed in twenty-four hour intervals. For example, the disconnection of node 102, at time 114, may occur on Day Three at 00:01 (UTC). It is noted that other disconnection time intervals (i.e., other than twenty-four hours) may also be used. In some examples, the disconnection time intervals may be long enough so that each node that is disconnected, and then reconnected, is able to fully synchronize with other active nodes before being disconnected again. As described below, there is no requirement that nodes must be disconnected at fixed intervals. For example, nodes may be disconnected at times that are determined dynamically or at other non-fixed intervals.

In some examples, after disconnecting a node, the system may wait for a short (e.g., between five and thirty minutes) buffer period to reconnect a previously disconnected node. In one specific example shown in FIG. 1, time 113 (at which node 104 is reconnected) may occur on Day Two at 00:21 UTC, which may be twenty minutes after time 112 (at which node 103 is disconnected). In some examples, time 113 may be selected as a random number of minutes after time 112, such as a random number between five minutes and thirty minutes. Use of the random time period may help to prevent scenarios in which high quantities of node disconnections are being performed at exactly the same time, which could result in a spike in usage of computing resources and potential resulting delays. The difference between time 113 and time 112 may be a buffer time period, which helps to ensure that node 103 is disconnected prior to reconnection of node 104. Similarly, time 115, at which node 103 is reconnected, may be selected by adding a buffer period to time 114, which is the time at which a subsequent node disconnection is performed for node 102. As shown in FIG. 1, time 115 may occur on Day Three at 00:16 UTC, which may be fifteen minutes after time 114.

As should be appreciated, while FIG. 1 depicts an example with four computing nodes (nodes 101-104), the node disconnection rotation techniques described herein may be employed in connection with systems including other quantities of computing nodes. It is also noted that various different node disconnection rotation schemes may be employed in connection with the techniques described herein. Specifically, in the example of FIG. 1, node 104 is disconnected at time 111, node 103 is disconnected at time 112, and node 102 is disconnected time 114. However, in some examples, at time 114, node 104 could be disconnected again instead of disconnecting node 102. In some examples, all of the nodes in a pool may take turns being disconnected, such as in a round-robin or other scheme. In some other examples, only some (and not all) of the nodes in a pool may take turns being disconnected. For example, in some cases, a given node may be disconnected, reconnected, and then disconnected again as soon as it has fully synchronized with the pool.

Figure 2:
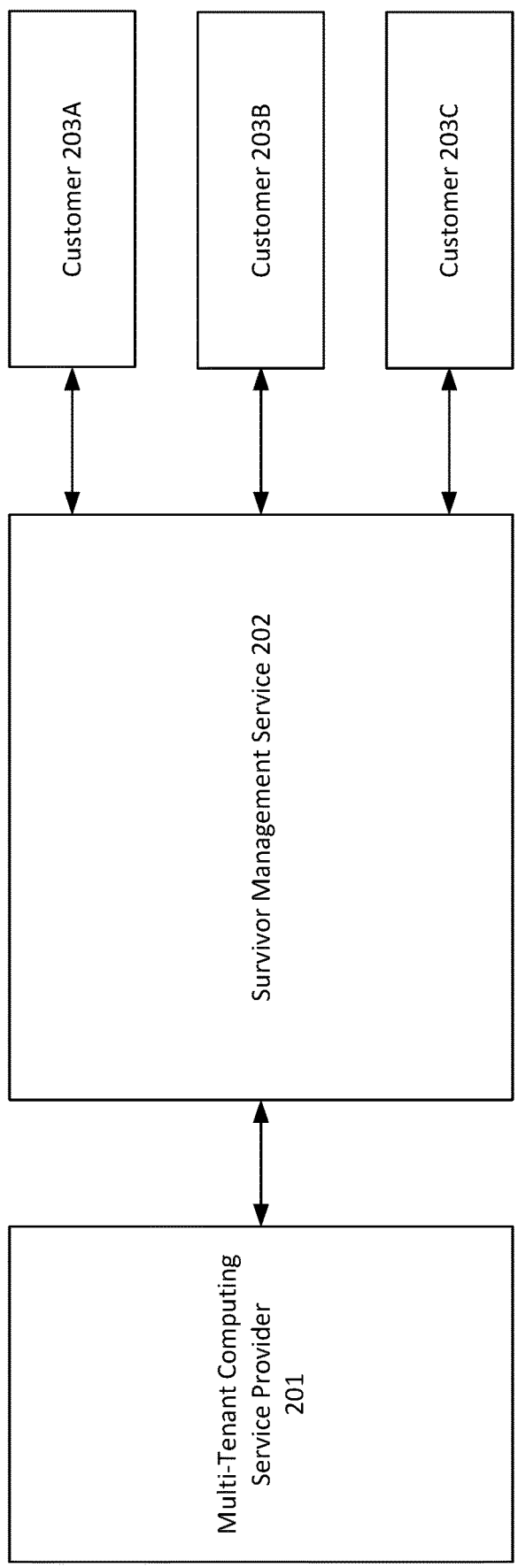
FIG. 2 is a diagram illustrating an example survivor management service that may be used in accordance with the present disclosure.

In some examples, management of the node disconnection rotation may be provided as a service, for example by a multi-tenant computing service provider. Providing these features as a service may allow for automated and highly robust control of various features of the node rotation, recovery, and other processes. Referring now to FIG. 2, an example is shown in which a multi-tenant computing service provider 201 may host execution of various computing resources on behalf of customers 203A-C. In this example, the multi-tenant computing service provider 201 provides a survivor management service 202, which may be made available to customers 203A-C. In some examples, survivor management service 202 may provide automated, or semi-automated, management of any, or all, features of the designated survivor techniques described herein. For example, survivor management service 202 may automatically disconnect and reconnect nodes 101-104 from, and to, the active synchronizing node pool 100. Additionally, in some examples, survivor management service 202 may optionally monitor node replication traffic within the active synchronizing node pool 100, such as to allow for dynamic node disconnection and reconnection. Furthermore, in some examples, survivor management service 202 may optionally provide a frozen node designation, such as to preserve a current system state for future use. Survivor management service may also allow new nodes to be automatically added to the active synchronizing node pool, such as to replace a frozen node or for other reasons. Also, in some examples, survivor management service 202 may provide a recovery mode for sanitizing and restoring a survivor node, such as including automated snapshotting, recovery tools (e.g., file scanning and malware scanning tools) and an isolated recovery environment (e.g., a sandbox, containerized environment, etc.). These and other features are described in detail below.

Figure 3:
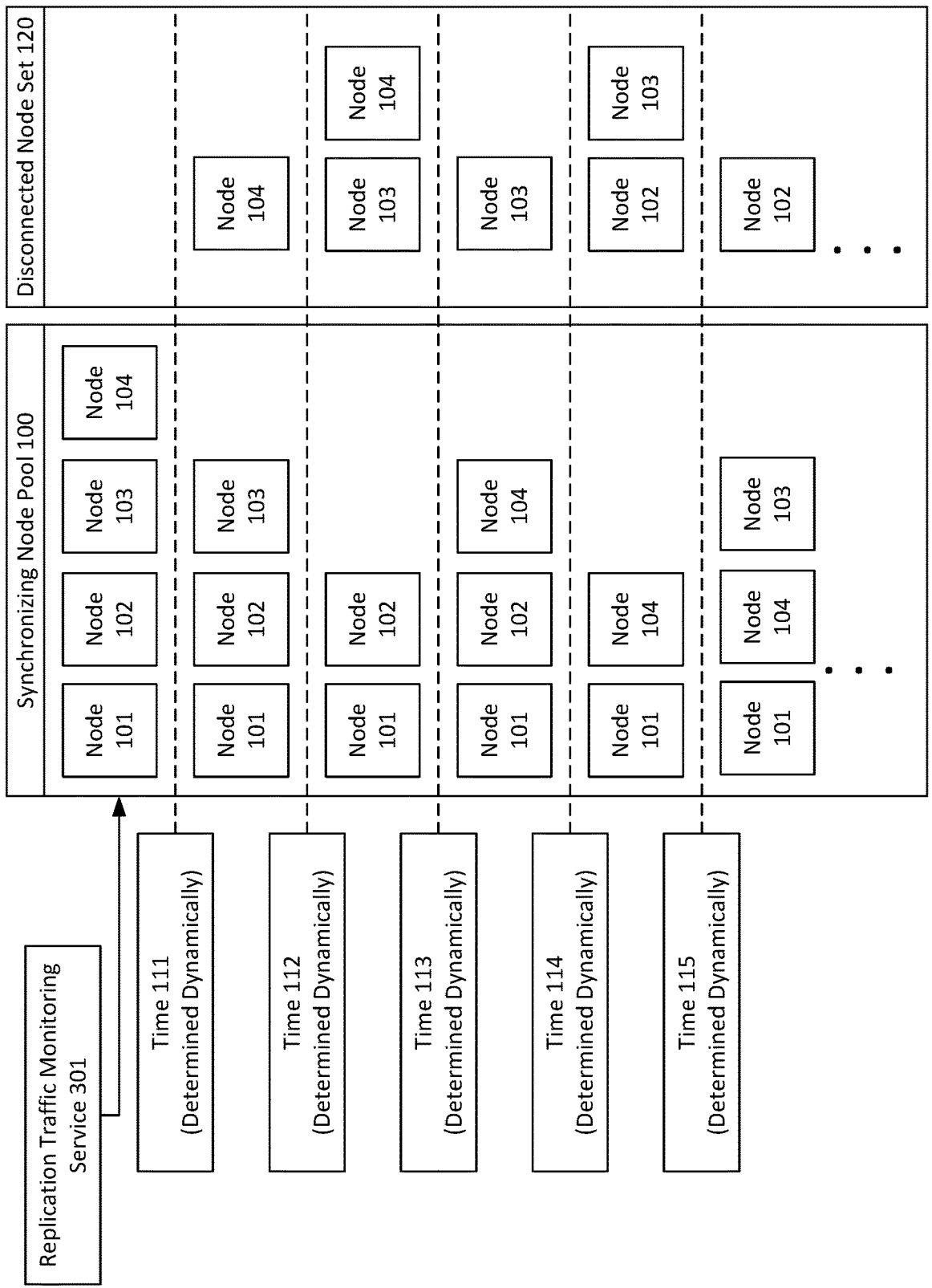
FIG. 3 is a diagram illustrating an example designated survivor system with dynamic node rotation that may be used in accordance with the present disclosure.

As described above, in some examples, nodes may be disconnected from the active synchronizing node pool 100 at fixed intervals, such as twenty-four hour intervals. In some other examples, however, the node disconnection intervals may vary dynamically. Referring now to FIG. 3, an example is shown in which node disconnection intervals may be determined dynamically. In FIG. 3, times 111-115 are determined dynamically (as indicated by the words "Determined Dynamically" in FIG. 3). In the example of FIG. 3, replication traffic monitoring service 301 monitors the active synchronizing node pool 100 to dynamically determine when a reconnected node has fully synchronized with other nodes in the active synchronizing node pool 100. In some examples, once a reconnected node has fully synchronized, the node may be disconnected again (and/or may be designated as eligible to be disconnected). This dynamic monitoring may help to ensure that a node is not disconnected from the active synchronizing node pool 100 before the node has had a chance to synchronize with other active nodes. Additionally, the dynamic monitoring techniques may also optionally allow node disconnections to be performed more frequently (by dynamically confirming when nodes are fully synchronized), thereby allowing survivor nodes to potentially be more up to date (since they may be disconnected for less time).

In some examples, after a survivor node has been disconnected from the active pool, a user may become aware, or may suspect, that the survivor node has been contaminated. For example, in some cases, the disconnected node could include malicious contents for launching a time-bomb attack that has been launched on active nodes but that has not yet launched on the disconnected node. In these scenarios, before restarting the disconnected node, a user may sanitize the disconnected node, such as by locating and removing the malicious contents. In some examples, a computing service may offer a recovery mode that provides a variety of features for sanitizing, recovering, and restarting a disconnected node that has been contaminated.

Figure 4:
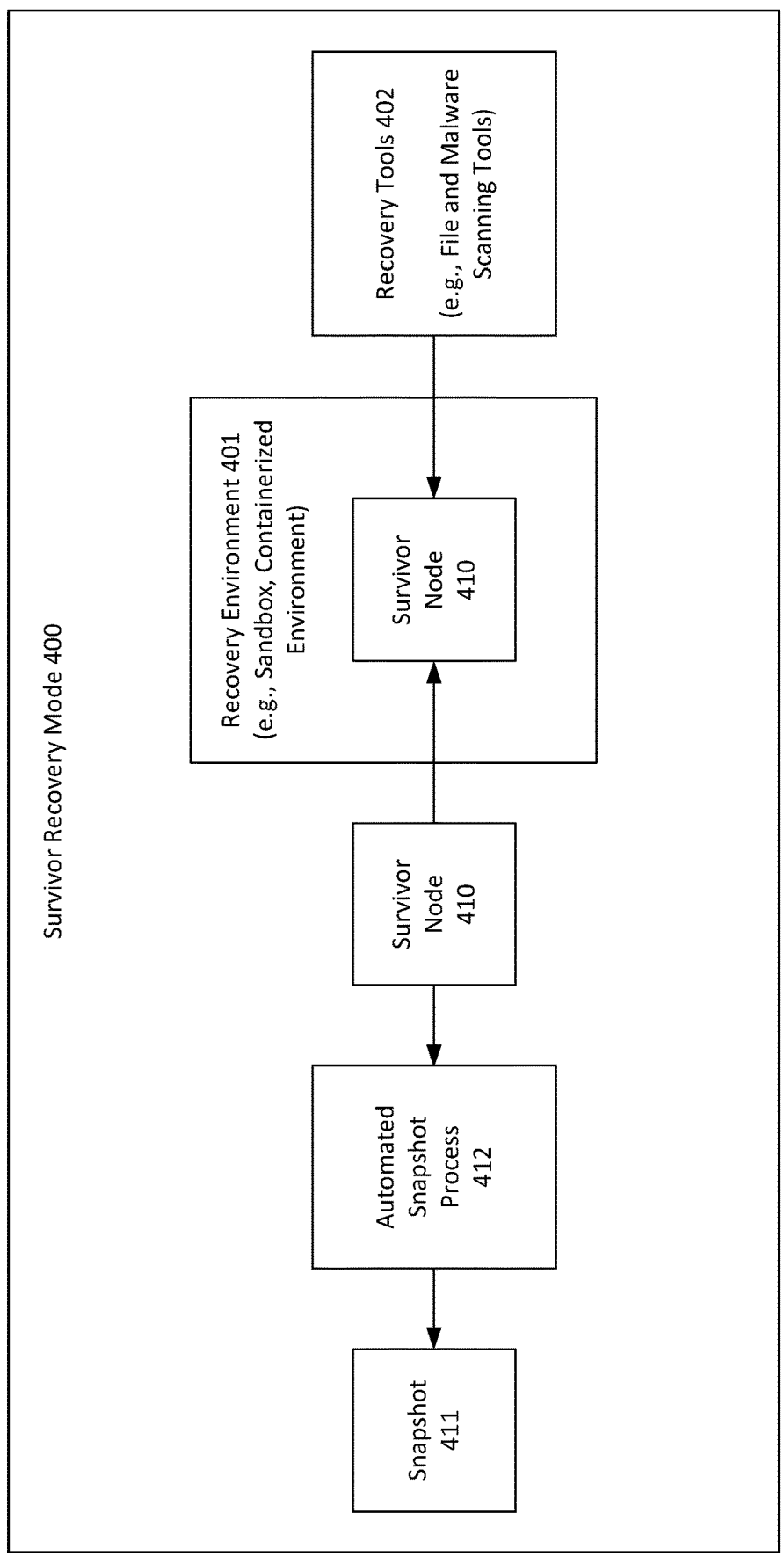
FIG. 4 is a diagram illustrating an example frozen node designation that may be used in accordance with the present disclosure.

Referring now to FIG. 4, an example of a survivor recovery mode 400 will now be described in detail. In some examples, survivor recovery mode 400 may be provided as a feature of survivor management service 202. In the example of FIG. 4, a survivor node 410 is disconnected from the active synchronizing node pool 100. During the time that survivor node 410 is disconnected, a user may become aware, or may suspect, that the survivor node 410 has been contaminated. As shown, the survivor recovery mode 400 includes an automated snapshot process 412, which may automatically generate a snapshot 411 (e.g., snapshot image) of survivor node 410. The snapshot 411 may allow a plurality of opportunities to sanitize and restart the survivor node 410. In some examples, a user need not explicitly request the creation of snapshot 411. Rather, in some examples, a user may simply indicate that he or she wishes to invoke the survivor recovery mode 400 for survivor node 410, and snapshot 411 may be automatically generated by the survivor recovery mode 400 on the user's behalf.

Additionally, the survivor recovery mode 400 provides a recovery environment 401, such as a sandbox and/or containerized environment. The recovery environment 401 may provide an isolated environment for performing forensics related to searching for malicious contents and restarting the survivor node 410. Furthermore, the survivor recovery mode 400 provides recovery tools 402, such as file scanning and/or malware scanning tools to assist in locating and removing the malicious contents of the disconnected node. In some examples, the recovery tools 402 may include tools developed by the multi-tenant computing service provider 201 as well as links to third-party tools, such as application programming interfaces (API's) and other interfaces.

Figure 5:
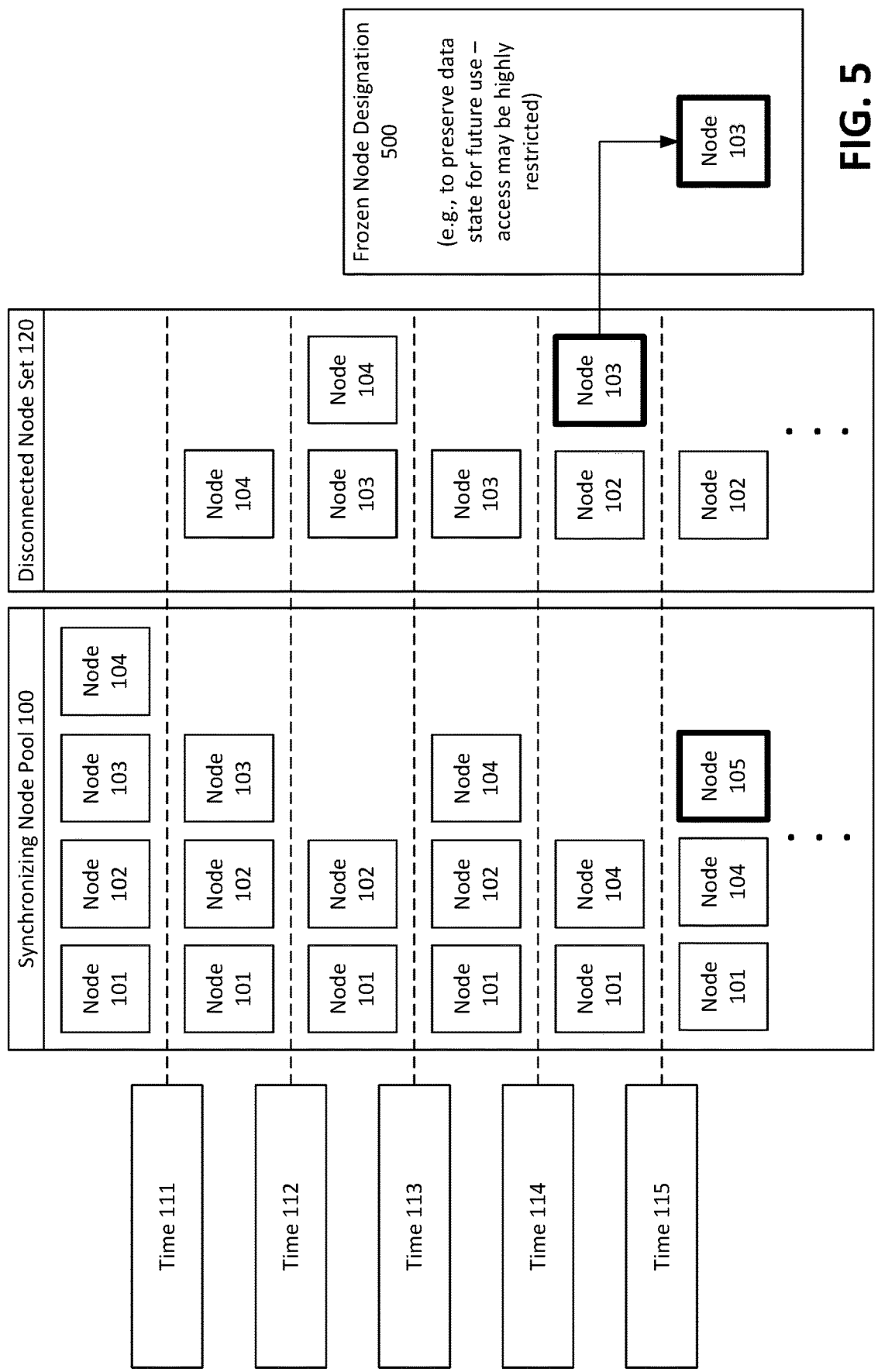
FIG. 5 is a diagram illustrating an example survivor recovery mode that may be used in accordance with the present disclosure.

In some examples, a node that is disconnected from the active synchronizing node pool may be frozen. This means that the disconnected node may not be reconnected to the system at its regular spot in the rotation (i.e., after a subsequent node disconnection). Referring now to FIG. 5, an example of a frozen node designation 500 will now be described in detail. As shown in FIG. 5, at time 115, instead of being reconnected to the active synchronizing node pool 100, node 103 is designated as a frozen node, such as by being assigned frozen node designation 500. In the example of FIG. 5, at time 115, node 103 is replaced with a replacement node (i.e., node 105) that is added to the active synchronizing node pool 100. The freezing of node 103 may allow a system's state at a given point in time to be preserved, such as for use at a later time. As a specific example, quarterly financial reports may be prepared for a business, and node 103 may be frozen at the end of a quarter. This may allow the system's state at the end of the quarter to be preserved, such as to allow the quarterly report to be prepared at a later time using the preserved state. In some examples, when a node 103 is frozen, access to node 103 may be highly restricted, such as to preserve the state of node 103. For example, in some cases, even a root user of an account that controls node 103 may be at least temporarily blocked from accessing node 103 while it is frozen. In some examples, as an alternative or in addition to freezing a replication system node itself, a snapshot of a replication system node, such as snapshot 411 of FIG. 4, may be acquired and may be designated as a frozen snapshot, meaning that the state of the snapshot is to be preserved, such as for use at a later time. Access to a frozen snapshot may also be highly restricted, such as in the manner described above for frozen system nodes.

Figure 6:
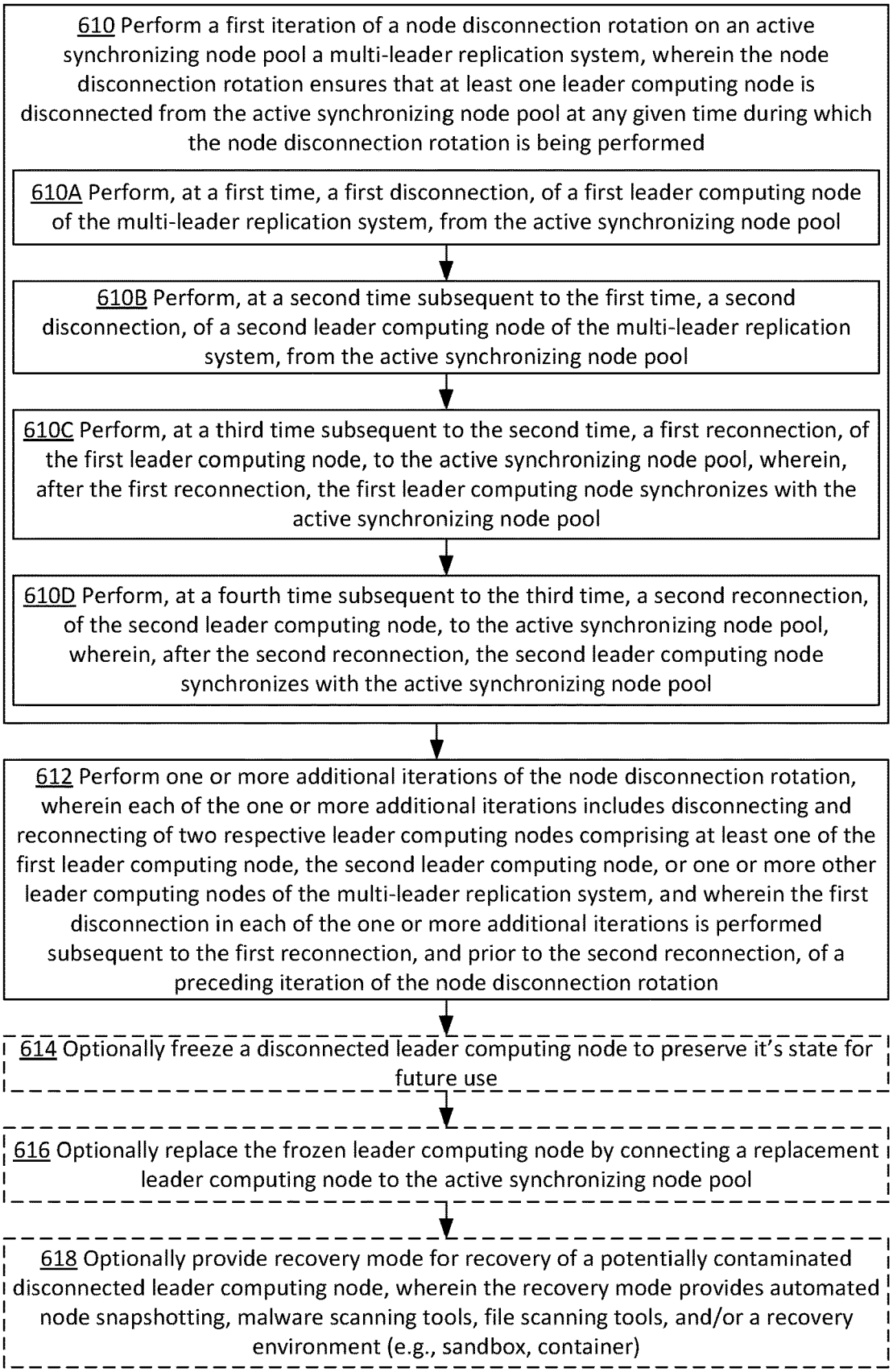
FIG. 6 is a flowchart illustrating an example designated survivor management process that may be used in accordance with the present disclosure.

FIG. 6 is a flowchart illustrating an example designated survivor management process that may be used in accordance with the present disclosure. The process of FIG. 6 is initiated at operation 610, at which a first iteration of a node disconnection rotation is performed on an active synchronizing node pool of a multi-leader replication system, wherein the node disconnection rotation ensures that at least one leader computing node is disconnected from the active synchronizing node pool at any given time during which the node disconnection rotation is being performed. Operation 610 includes sub-operations 610A-610D, which may be included in the performing of the first iteration of the node disconnection rotation. At sub-operation 610A, a first disconnection, of a first leader computing node of the multi-leader replication system, from the active synchronizing node pool, is performed, at a first time. For example, as shown in FIG. 1, at time 111, a first disconnection is performed, of node 104, from the active synchronizing node pool 100. At sub-operation 610B, a second disconnection, of a second leader computing node of the multi-leader replication system, from the active synchronizing node pool, is performed, at a second time. For example, as shown in FIG. 1, at time 112, which is subsequent to time 111, a second disconnection may be performed of node 103, from the active synchronizing node pool 100. At sub-operation 610C, a first reconnection, of the first leader computing node, to the active synchronizing node pool, is performed, at a third time subsequent to the second time, wherein, after the first reconnection, the first leader computing node synchronizes with the active synchronizing node pool. For example, as shown in FIG. 1, at time 113, which is subsequent to time 112, a first reconnection may be performed of node 104, to the active synchronizing node pool 100. After the first reconnection, node 104 may be synchronized with the active synchronizing node pool 100. At sub-operation 610D, a second reconnection, of the second leader computing node, to the active synchronizing node pool, is performed, at a fourth time subsequent to the third time, wherein, after the second reconnection, the second leader computing node synchronizes with the active synchronizing node pool. For example, as shown in FIG. 1, at time 115, which is subsequent to time 113, a second reconnection may be performed of node 103, to the active synchronizing node pool 100. After the second reconnection, node 103 may be synchronized with the active synchronizing node pool 100.

At operation 612, one or more additional iterations of the node disconnection rotation are performed, wherein each of the one or more additional iterations includes disconnecting and reconnecting of two respective leader computing nodes comprising at least one of the first leader computing node, the second leader computing node, or one or more other leader computing nodes, and wherein the first disconnection in each of the one or more additional iterations is performed subsequent to the first reconnection, and prior to the second reconnection, of a preceding iteration of the node disconnection rotation. For example, in FIG. 1, a first disconnection of a second iteration of the node disconnection rotation is performed, at time 114, by disconnecting node 102 from the active synchronizing node pool 100. Time 114 is subsequent to the first reconnection of the first iteration of the node disconnection rotation (e.g., the reconnection of node 104), which is performed at time 113. Additionally, time 114 is prior to the second reconnection of the first iteration of the node disconnection rotation (e.g., the reconnection of node 103), which is performed at time 115.

As described above, the active synchronizing node pool may be included in a multi-leader replication system. The node rotation may be performed on any, or all, leader nodes of the multi-leader replication system. Leader nodes are nodes that may receive data writes and replicate (e.g., asynchronously) the writes to other leader nodes. In some examples, management of the node disconnection rotation may be provided as a service, for example by a multi-tenant computing service provider. Providing these features as a service may allow for automated and highly robust control of various features of the node rotation, recovery, and other processes. As also described above, node disconnections may be performed at fixed intervals, such as at twenty-four hour intervals. However, there is no requirement that nodes must be disconnected at fixed intervals. For example, nodes may be disconnected at times that are determined dynamically or at other non-fixed intervals. For example, in some cases, an automated monitoring service, such as replication traffic monitoring service 301 of FIG. 3, may monitor the active synchronizing node pool to dynamically determine when a reconnected node has fully synchronized with other nodes in the active synchronizing node pool. In some examples, once a reconnected node has fully synchronized, the node may be disconnected again (and/or may be designated as eligible to be disconnected). This dynamic monitoring may help to ensure that a node is not disconnected from the active synchronizing pool before the node has had a chance to synchronize with other active nodes. Additionally, the dynamic monitoring techniques may also optionally allow node disconnections to be performed more frequently (by dynamically confirming when nodes are fully synchronized), thereby allowing survivor nodes to potentially be more up to date (since they may be disconnected for less time). For example, the replication traffic monitoring service 301 may monitor the active synchronizing node pool to determine when the first leader computing node synchronizes with the active synchronizing node pool. A fifth time at which to re-disconnect the first leader computing node from the active synchronizing node pool may then be selected based on the first node fully synchronizing with the active synchronizing node pool.

At operation 614, a disconnected leader computing node may be optionally frozen to preserve its state for future use. As described above, a node that is disconnected from the active synchronizing node pool may be frozen. This means that the disconnected node may not be reconnected to the system at its regular spot in the rotation (i.e., after a subsequent node disconnection). For example, as shown in FIG. 5, at time 115, instead of being reconnected to the active synchronizing node pool 100, node 103 is designated as a frozen node, such as by being assigned frozen node designation 500. The freezing of node 103 may allow a system's state at a given point in time to be preserved, such as for use at a later time. As a specific example, quarterly financial reports may be prepared for a business, and node 103 may be frozen at the end of a quarter. This may allow the system's state at the end of the quarter to be preserved, such as to allow the quarterly report to be prepared at a later time using the preserved state. In some examples, when a node is frozen, access to node may be highly restricted, such as to preserve its data state. For example, in some cases, even a root user of an account that controls a frozen node may be at least temporarily blocked from accessing the node while it is frozen.

At operation 616, a leader computing frozen node may be optionally replaced by connecting a replacement leader computing node to the active synchronizing node pool. In one specific example, a third leader computing node may be disconnected from the active synchronizing node pool, and a data state of the third leader computing node may be preserved for future use. The third leader computing node may then be replaced by connecting a replacement leader computing node to the active synchronizing node pool. In the example of FIG. 5, at time 115, node 103 is replaced with a replacement node (i.e., node 105) that is added to the active synchronizing node pool 100.

At operation 618, a recovery mode may optionally be provided for recovery of a potentially contaminated disconnected leader computing node, wherein the recovery mode provides automated node snapshotting, malware scanning tools, file scanning tools, and/or a recovery environment (e.g., sandbox, container). For example, a recovery mode may be provided that allows sanitizing of the first leader computing node while the first leader computing node is disconnected from the active synchronizing node pool, and the recovery mode may provide at least one of automated node snapshotting, malware scanning tools, file scanning tools, or an execution sandbox for recovery of the first leader computing node. As described above, in some examples, after a survivor node has been disconnected from the active pool, a user may become aware, or may suspect, that the survivor node has been contaminated. For example, in some cases, the disconnected node could include malicious contents for launching a time-bomb attack that has been launched on active nodes but that has not yet launched on the disconnected node. In these scenarios, before restarting the disconnected node, a user may sanitize the disconnected node, such as by locating and removing the malicious contents. In some examples, a computing service may offer a recovery mode that provides a variety of features for sanitizing, recovering, and restarting a disconnected node that has been contaminated.

In the example of FIG. 4, survivor recovery mode 400 may be provided as a feature of survivor management service 202. The survivor recovery mode 400 includes an automated snapshot process 412, which may automatically generate a snapshot 411 (e.g., snapshot image) of survivor node 410. The snapshot 411 may allow a plurality of opportunities to sanitize and restart the survivor node 410. In some examples, a user need not explicitly request the creation of snapshot 411. Rather, in some examples, a user may simply indicate that he or she wishes to invoke the survivor recovery mode 400 for survivor node 410, and snapshot 411 may be automatically generated by the survivor recovery mode 400 on the user's behalf. Additionally, the survivor recovery mode 400 provides a recovery environment 401, such as a sandbox and/or containerized environment. The recovery environment 401 may provide an isolated environment for performing forensics related to searching for malicious contents and restarting the survivor node 410. Furthermore, the survivor recovery mode 400 provides recovery tools 402, such as file scanning and/or malware scanning tools to assist in locating and removing the malicious contents of the disconnected node. In some examples, the recovery tools 402 may include tools developed by the multi-tenant computing service provider 201 as well as links to third-party tools, such as application programming interfaces (API's) and other interfaces.

The process of FIG. 6 is described above in relation to leader nodes of a multi-leader replication system. However, it is noted that the process of FIG. 6 may also be employed in connection with other multi-node replication systems that are not necessarily multi-leader replication systems. Thus, any of the techniques described in FIG. 6 as being applied to a leader computing node may also be applicable to other computing nodes in a multi-node replication system that are not necessarily considered leader nodes.

Figure 7:
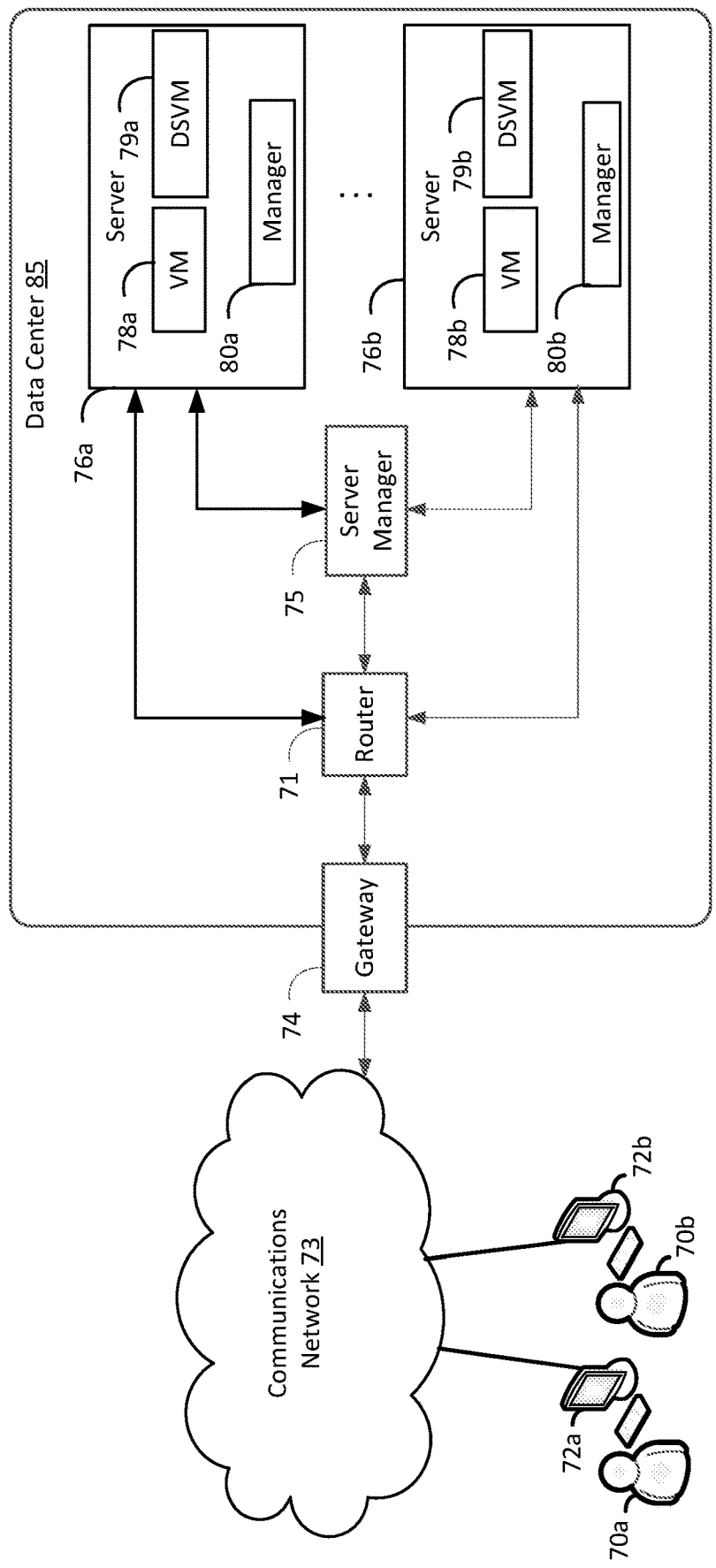
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also designated survivor virtual machines (DSVM's) 79*a-b*, which are virtual machines that are configured to execute any, or all, of the designated survivor node rotation, recovery and other techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76*a* and 76*b*. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
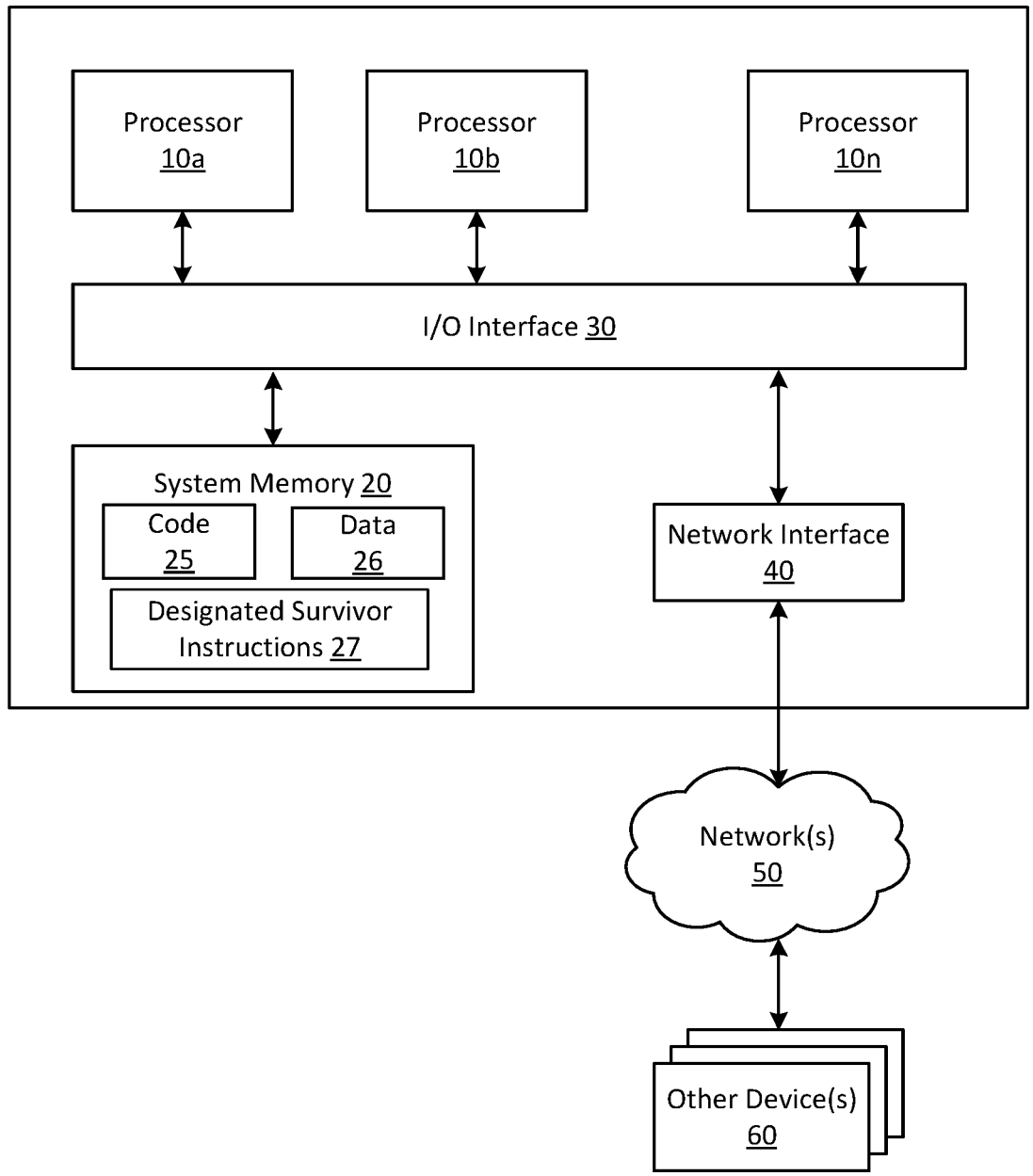
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes designated survivor instructions 27, which are instructions for executing any, or all, of the designated survivor node rotation, recovery and other techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, and others. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform computing operations comprising:
performing a first iteration of a node disconnection rotation on an active synchronizing node pool of a multi-leader replication system, wherein the node disconnection rotation ensures that at least one leader computing node is disconnected from the active synchronizing node pool at any given time during which the node disconnection rotation is being performed, wherein management of the node disconnection rotation is provided as a service by a multi-tenant computing service provider, and wherein the performing of the first iteration comprises:
performing, at a first time, a first disconnection, of a first leader computing node of the multi-leader replication system, from the active synchronizing node pool;
performing, at a second time subsequent to the first time, a second disconnection, of a second leader computing node of the multi-leader replication system, from the active synchronizing node pool;
performing, at a third time subsequent to the second time, a first reconnection, of the first leader computing node, to the active synchronizing node pool, wherein, after the first reconnection, the first leader computing node synchronizes with the active synchronizing node pool;
performing, at a fourth time subsequent to the third time, a second reconnection, of the second leader computing node, to the active synchronizing node pool, wherein, after the second reconnection, the second leader computing node synchronizes with the active synchronizing node pool; and
performing one or more additional iterations of the node disconnection rotation, wherein each of the one or more additional iterations includes disconnecting and reconnecting of two respective leader computing nodes comprising at least one of the first leader computing node, the second leader computing node, or one or more other leader computing nodes of the multi-leader replication system, and wherein the first disconnection in each of the one or more additional iterations is performed subsequent to the first reconnection of a preceding iteration of the node disconnection rotation and prior to the second reconnection of the preceding iteration of the node disconnection rotation.

2. The computing system of claim 1, wherein the operations further comprise:
providing a recovery mode that allows sanitizing of the first leader computing node while the first leader computing node is disconnected from the active synchronizing node pool.

3. The computing system of claim 2, wherein the recovery mode provides at least one of automated node snapshotting, malware scanning tools, file scanning tools, or an execution sandbox for recovery of the first leader computing node.

4. The computing system of claim 1, wherein the operations further comprise:
monitoring the active synchronizing node pool to determine when the first leader computing node fully synchronizes with the active synchronizing node pool; and
selecting, based on the first leader computing node fully synchronizing with the active synchronizing node pool, a fifth time at which to re-disconnect the first leader computing node from the active synchronizing node pool.

5. A computer-implemented method comprising:
performing a first iteration of a node disconnection rotation on an active synchronizing node pool of a multi-node replication system, wherein the node disconnection rotation ensures that at least one computing node is disconnected from the active synchronizing node pool at any given time during which the node disconnection rotation is being performed, wherein the performing of the first iteration comprises:
performing, at a first time, a first disconnection, of a first computing node of the multi-node replication system, from the active synchronizing node pool;

performing, at a second time subsequent to the first time, a second disconnection, of a second computing node of the multi-node replication system, from the active synchronizing node pool;

performing, at a third time subsequent to the second time, a first reconnection, of the first computing node, to the active synchronizing node pool, wherein, after the first reconnection, the first computing node synchronizes with the active synchronizing node pool;

performing, at a fourth time subsequent to the third time, a second reconnection, of the second computing node, to the active synchronizing node pool, wherein, after the second reconnection, the second computing node synchronizes with the active synchronizing node pool; and performing one or more additional iterations of the node disconnection rotation, wherein each of the one or more additional iterations includes disconnecting and reconnecting of two respective computing nodes comprising at least one of the first computing node, the second computing node, or one or more other computing nodes of the multi-node replication system, and wherein the first disconnection in each of the one or more additional iterations is performed subsequent to the first reconnection of a preceding iteration of the node disconnection rotation and prior to the second reconnection of the preceding iteration of the node disconnection rotation.

6. The computer-implemented method of claim 5, further comprising:
providing a recovery mode that allows sanitizing of the first computing node while the first computing node is disconnected from the active synchronizing node pool.

7. The computer-implemented method of claim 6, wherein the recovery mode provides at least one of automated node snapshotting, malware scanning tools, file scanning tools, or an execution sandbox for recovery of the first computing node.

8. The computer-implemented method of claim 5, further comprising:
monitoring the active synchronizing node pool to determine when the first computing node fully synchronizes with the active synchronizing node pool.

9. The computer-implemented method of claim 8, further comprising:
selecting, based on the first computing node fully synchronizing with the active synchronizing node pool, a fifth time at which to re-disconnect the first computing node from the active synchronizing node pool.

10. The computer-implemented method of claim 5, further comprising:
disconnecting a third computing node from the active synchronizing node pool; and
preserving a data state of the third computing node for future use.

11. The computer-implemented method of claim 10, further comprising:
replacing the third computing node by connecting a replacement computing node to the active synchronizing node pool.

12. The computer-implemented method of claim 5, wherein management of the node disconnection rotation is provided as a service by a multi-tenant computing service provider.

13. One or more non-transitory computer-readable storage media having stored thereon computing instructions that, upon execution by one or more computing devices, cause the one or more computing devices to perform computing operations comprising:
performing a first iteration of a node disconnection rotation on an active synchronizing node pool of a multi-node replication system, wherein the node disconnection rotation ensures that at least one computing node is disconnected from the active synchronizing node pool at any given time during which the node disconnection rotation is being performed, wherein the performing of the first iteration comprises:
performing, at a first time, a first disconnection, of a first computing node of the multi-node replication system, from the active synchronizing node pool;
performing, at a second time subsequent to the first time, a second disconnection, of a second computing node of the multi-node replication system, from the active synchronizing node pool;
performing, at a third time subsequent to the second time, a first reconnection, of the first computing node, to the active synchronizing node pool, wherein, after the first reconnection, the first computing node synchronizes with the active synchronizing node pool;
performing, at a fourth time subsequent to the third time, a second reconnection, of the second computing node, to the active synchronizing node pool, wherein, after the second reconnection, the second computing node synchronizes with the active synchronizing node pool; and
performing one or more additional iterations of the node disconnection rotation, wherein each of the one or more additional iterations includes disconnecting and reconnecting of two respective computing nodes comprising at least one of the first computing node, the second computing node, or one or more other computing nodes of the multi-node replication system, and wherein the first disconnection in each of the one or more additional iterations is performed subsequent to the first reconnection of a preceding iteration of the node disconnection rotation and prior to the second reconnection of the preceding iteration of the node disconnection rotation.

14. The one or more non-transitory computer-readable storage media of claim 13, wherein the operations further comprise:
providing a recovery mode that allows sanitizing of the first computing node while the first computing node is disconnected from the active synchronizing node pool.

15. The one or more non-transitory computer-readable storage media of claim 14, wherein the recovery mode provides at least one of automated node snapshotting, malware scanning tools, file scanning tools, or an execution sandbox for recovery of the first computing node.

16. The one or more non-transitory computer-readable storage media of claim 13, wherein the operations further comprise:
monitoring the active synchronizing node pool to determine when the first computing node fully synchronizes with the active synchronizing node pool.

17. The one or more non-transitory computer-readable storage media of claim 16, wherein the operations further comprise:
selecting, based on the first computing node fully synchronizing with the active synchronizing node pool, a fifth time at which to re-disconnect the first computing node from the active synchronizing node pool.

18. The one or more non-transitory computer-readable storage media of claim 13, wherein the operations further comprise:
  disconnecting a third computing node from the active synchronizing node pool; and
  preserving a data state of the third computing node for future use.

19. The one or more non-transitory computer-readable storage media of claim 18, wherein the operations further comprise:
  replacing the third computing node by connecting a replacement computing node to the active synchronizing node pool.

20. The one or more non-transitory computer-readable storage media of claim 13, wherein management of the node disconnection rotation is provided as a service by a multi-tenant computing service provider.

\* \* \* \* \*